(12) United States Patent
Nogami et al.

(10) Patent No.: US 8,436,765 B2
(45) Date of Patent: May 7, 2013

(54) COMMUNICATION PROCESSING DEVICE AND DISTANCE MEASUREMENT METHOD IN COMMUNICATION PROCESSING DEVICE

(75) Inventors: Hidekatsu Nogami, Kusatsu (JP); Hirokazu Kasai, Kyoto (JP); Shuichi Matsui, Kusatsu (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 13/358,855

(22) Filed: Jan. 26, 2012

(65) Prior Publication Data

US 2012/0235856 A1   Sep. 20, 2012

Related U.S. Application Data

(63) Continuation of application No. PCT/JP2011/056908, filed on Mar. 23, 2011.

(30) Foreign Application Priority Data

Mar. 14, 2011   (JP) ................. 2011-055459

(51) Int. Cl.
G01S 13/08   (2006.01)
G01S 5/04   (2006.01)
G01S 3/02   (2006.01)

(52) U.S. Cl.
USPC ................... 342/118; 342/442; 342/458

(58) Field of Classification Search ............... 342/118, 342/442, 458, 463; 340/10.4, 10.52
See application file for complete search history.

(56) References Cited

U.S. PATENT DOCUMENTS 7,649,491 B2   1/2010 Ohara et al.
7,903,022 B2   3/2011 Ohara et al.
2008/0150699 A1   6/2008 Ohara et al.
2010/0076722 A1   3/2010 Ohara et al.

FOREIGN PATENT DOCUMENTS

| JP | 63-40891 | 2/1988 |
| JP | 4265686 B2 | 2/2009 |
| JP | 2011-37371 | 2/2011 |
| WO | 2006/095463 | 9/2006 |

OTHER PUBLICATIONS

U.S. Appl. No. 13/297,726 to Hidekatsu Nogami et al., which was filed Nov. 16, 2011.
International Search Report for corresponding International Application No. PCT/JP2011/056908, dated Apr. 19, 2011.
Written Opinion of the International Searching Authority for corresponding International Application No. PCT/JP2011/056908, dated Apr. 19, 2011.
English Language Abstract of EP1863190 A1, which corresponds to JP 4265686 B2, dated May 20, 2009.

*Primary Examiner* — Dao Phan
(74) *Attorney, Agent, or Firm* — Greenblum & Bernstein, P.L.C.

(57) ABSTRACT

A radio frequency signal oscillator and an intermediate frequency signal oscillator are incorporated in a communication processing device, and a carrier wave with which an intermediate frequency signal is overlapped is generated using the oscillators and transmitted from an antenna. Mixers separate and extract an I signal and a Q signal from the intermediate frequency signal in the signal received by the antenna. A phase difference detector detects a phase difference of the intermediate frequency signal in a reflected wave to the intermediate frequency signal in the carrier wave using the I signal and the Q signal after the reception of the reflected wave from a tag is started. A distance calculator calculates a distance from the antenna to the tag using the phase difference and a wavelength of the intermediate frequency signal.

3 Claims, 4 Drawing Sheets

COMMUNICATION PROCESSING DEVICE AND DISTANCE MEASUREMENT METHOD IN COMMUNICATION PROCESSING DEVICE

CROSS-REFERENCE TO RELATED APPLICATION

This is a continuation application of PCT/JP11/056908 filed Mar. 23, 2011, designating the United States of America, the disclosure of which, including the specification, drawings, and claims, is incorporated by reference in its entirety. The disclosure of Japanese Patent Application No. 2011-055459 filed Mar. 14, 2011, including the specification, drawings, and claims are expressly incorporated herein by reference in its entirety.

FIELD OF THE INVENTION

The present disclosure relates to a communication processing device that conducts communication with an RFID tag using a continuous carrier wave, particularly to a technology of measuring a distance between a communication processing device and an RFID tag (hereinafter sometimes simply referred to as a "tag") that responds to a command from the communication processing device.

BACKGROUND INFORMATION

In an RFID communication processing device, a process in which a command is transmitted to a tag such that a carrier wave having a constant frequency is modulated while continuously transmitted and a process of transmitting an unmodulated carrier wave (called a Continuous Wave or CW for short) to receive a response from the tag are alternately performed. The tag that receives the command responds to the command by changing impedance of a circuit thereof. A signal (reflected wave) in which a reply signal with respect to the command is overlapped with the unmodulated carrier wave is sent back to the communication processing device by response operation of the tag, and the reply signal is decoded.

In RFID system installed in a production site or a physical distribution site, it is necessary to conduct communication with the tag within a previously-fixed communication range. However, depending on a wavelength of a radio wave used, sometimes the radio wave reaches a position beyond a necessary distance. Sometimes the radio wave is guided to a distant tag such that the radio wave is reflected by a floor or a wall of the site. As a result, the tag that exists in a position in which necessity of communication is not generated responds to the command, which results in a risk of generating a problem in information processing. FIG. 4 illustrates a specific example.

In the example of FIG. 4, antennas A1 and A2 of the communication processing device are disposed on sides of paths B1 and B2 parallel to each other, and information is read from a tag T attached to a vehicle C running on the paths B1 and B2 through the antennas A1 and A2. In the example of FIG. 4, it is necessary that only the antenna A1 corresponding to the path B1 on which the vehicle C is located can conduct communication with the tag T. However, the radio wave from the antenna A2 of the adjacent path B2 also reaches the tag T, and the tag T responds to the command from the antenna A2, which results in a risk of reading and writing false information.

In order to solve the above problem, there is a method for measuring a distance from the antenna to the tag to determine whether the measured distance is included in a communication range. A measuring method in which a phase shift of the reflected wave from the tag to the carrier wave transmitted from the antenna is utilized is also proposed as the method for measuring the distance from the antenna to the tag.

For example, in the description of Patent Document 1, there is described that the carrier waves of two ways having different frequencies are sequentially transmitted, an amount of change of the phase of the reflected wave from the tag is detected in each frequency, and the distance to the tag is fixed by a calculation in which a difference between the amounts of change is utilized.

In the description of Patent Document 2, there is described that communication is conducted with the tag attached to a moving object (train) that passes through a fixed path (railway track) using two antennas, a phase difference between reply signals that are received from the tag by the antennas is fixed, and a distance $\Delta L$ is fixed using the phase difference and a wavelength of the reply signal. Additionally, in the description of Patent Document 2, there is described that a hyperbolic curve, which is constructed by points at which a difference between the distances from the antennas becomes $\Delta L$, is set by utilizing the distance $\Delta L$ that corresponds to a difference between a distance L1 from one of the antennas to the tag and a distance L2 from the other antenna to the tag, and the position of the tag is specified using the hyperbolic curve and a distance from a tag reader to the movement path of the tag (see paragraphs 0057 to 0061 and FIG. 4 of Patent Document 1).

Patent Documents

Patent Document 1: Japanese Patent No. 4265686

Patent Document 2: Japanese Unexamined Patent Publication No. 2011-37371

Problems Solved by the Disclosure

A method for detecting an amount of phase shift of the reflected wave from the tag to the carrier wave transmitted from the antenna and measuring the distance to the tag using the detected amount of phase shift and the wavelength of the carrier wave is also conceivable as a method that is simpler than the inventions described in Patent Documents 1 and 2. However, in the method, it is assumed that the radio wave transmitted from the antenna returns to the antenna through the path that becomes a length of one period or less there and back. That is, the distance up to a half period of the carrier wave can be measured by the method.

However, it is hardly considered that the condition is satisfied in the case that the carrier wave having the short wavelength is used, so that it is difficult to put such a method into practical use.

For example, in the case that the radio wave of 1 GHz in a UHF band is utilized, the carrier wave has the wavelength of about 30 cm, and this kind of radio wave has intensity to which the tag can react even if the radio wave reaches the position about 10 m away from the antenna. Generally, a communication distance is set in meters by utilizing the characteristic. The specifications cannot be applied to the distance measurement in which the phase difference between the signals having wavelengths of about 30 cm is used.

In view of the above problem, an object of the present disclosure is to implement measurement that can deal with the setting of the actual communication process such that the carrier wave with which an intermediate frequency is overlapped is transmitted during a cycle in which the reflected wave is received from the tag and such that the distance is measured by utilizing the phase shift of the intermediate frequency.

SUMMARY OF THE DISCLOSURE

A communication processing device according to the present disclosure executes a command transmission process of transmitting a command relative to an RFID tag by modulating a carrier wave output from an antenna, a reception process of receiving, while an unmodulated carrier wave is transmitted from the antenna according to transmission of the command, a reflected wave from the RFID tag relative to the unmodulated carrier wave, and a decoding process of decoding, from the received reflected wave, a reply signal from the RFID tag. The communication processing device includes carrier wave processing means (a carrier wave communication processor) for overlapping an intermediate frequency signal with a carrier wave output from the antenna; phase difference detection means (a phase difference detector) for extracting the intermediate frequency signal from a reflected wave in response to initiation of reception of a reflected wave in the reception process, and detecting a phase difference of the extracted intermediate frequency signal from the intermediate frequency signal in the carrier wave output at a timing corresponding to the extraction; and distance measurement means (a distance measurement calculator) for measuring a distance to the RFID tag returning the reflected wave, using the phase difference detected by the phase difference detection means (a phase difference detector) and a wavelength of the intermediate frequency signal.

According to the above configuration, the intermediate frequency signal is overlapped with the unmodulated carrier wave that receives the response from the tag with respect to the command, and the distance to the tag is measured by utilizing the phase difference generated in the intermediate frequency signal, so that the distance that can deal with a general application in which the RFID is used can be measured. For example, when the signal having the frequency of 15 MHz is used as the intermediate frequency signal, the wavelength of the signal becomes about 20 m, so that the distance up to 10 m that is a half of the wavelength can be measured.

In one embodiment of the communication processing device, the phase difference detection means (the phase difference detector) executes extraction of an intermediate frequency signal and detection of phase difference in response to detection of a preamble in the response information by the decoding process. Because the preamble in the reply signal has a configuration in which bit signals of "1" and "0" are arrayed in a constant pattern, whether the reception of the reflected wave is easily made by detecting the pattern, and the extraction of the intermediate frequency signal and the detection of the phase difference can be performed. The noise reflected wave that is reflected by the floor or the wall to return to the communication processing device can be prevented from being falsely recognized as the reflected wave from the tag.

The communication processing device according to another embodiment further includes determination means (a decoding processor) for determining whether the RFID tag returning the reflected wave is suitable as a target of communication based on the distance measured by the distance measurement means (the distance measurement calculator). Therefore, only the reply signal from the tag existing within the range of the fixed distance can easily be adopted, and the false information processing can be prevented from being performed.

A preferred mode of the communication processing device of the present disclosure is an RFID reader/writer that writes and reads the information in and from an RFID tag. Alternatively, the communication processing device of the present disclosure may be an RFID reader that only reads the information.

A distance measurement method of the present disclosure is implemented in a communication processing device executing a command transmission process of transmitting a command relative to an RFID tag by modulating a carrier wave output from an antenna, a reception process of receiving, while an unmodulated carrier wave is transmitted from the antenna according to transmission of the command, a reflected wave from the RFID tag relative to the unmodulated carrier wave, and a decoding process of decoding a reply signal from the RFID tag included in the received reflected wave. The distance measurement method includes overlapping an intermediate frequency signal with a carrier wave output from antenna; extracting the intermediate frequency signal from a reflected wave in response to initiation of reception of a reflected wave in the reception process, and detecting a phase difference of the extracted intermediate frequency signal from the intermediate frequency signal in the carrier wave output at a timing corresponding to the extraction.; and measuring a distance to the RFID tag returning the reflected wave, using the detected phase difference and a wavelength of the intermediate frequency signal.

Effect of the Disclosure

According to the present disclosure, the intermediate frequency signal is overlapped with the unmodulated carrier wave output from the antenna in order to receive the response from the RFID tag in response to the command, and the distance to the tag is measured using the phase difference between the intermediate frequency signal included in the reflected wave from the RFID tag and the intermediate frequency signal included in the currently-transmitted carrier wave, so that the distance of the length corresponding to the settable communication distance can be measured.

DETAILED DESCRIPTION

Figure 1:
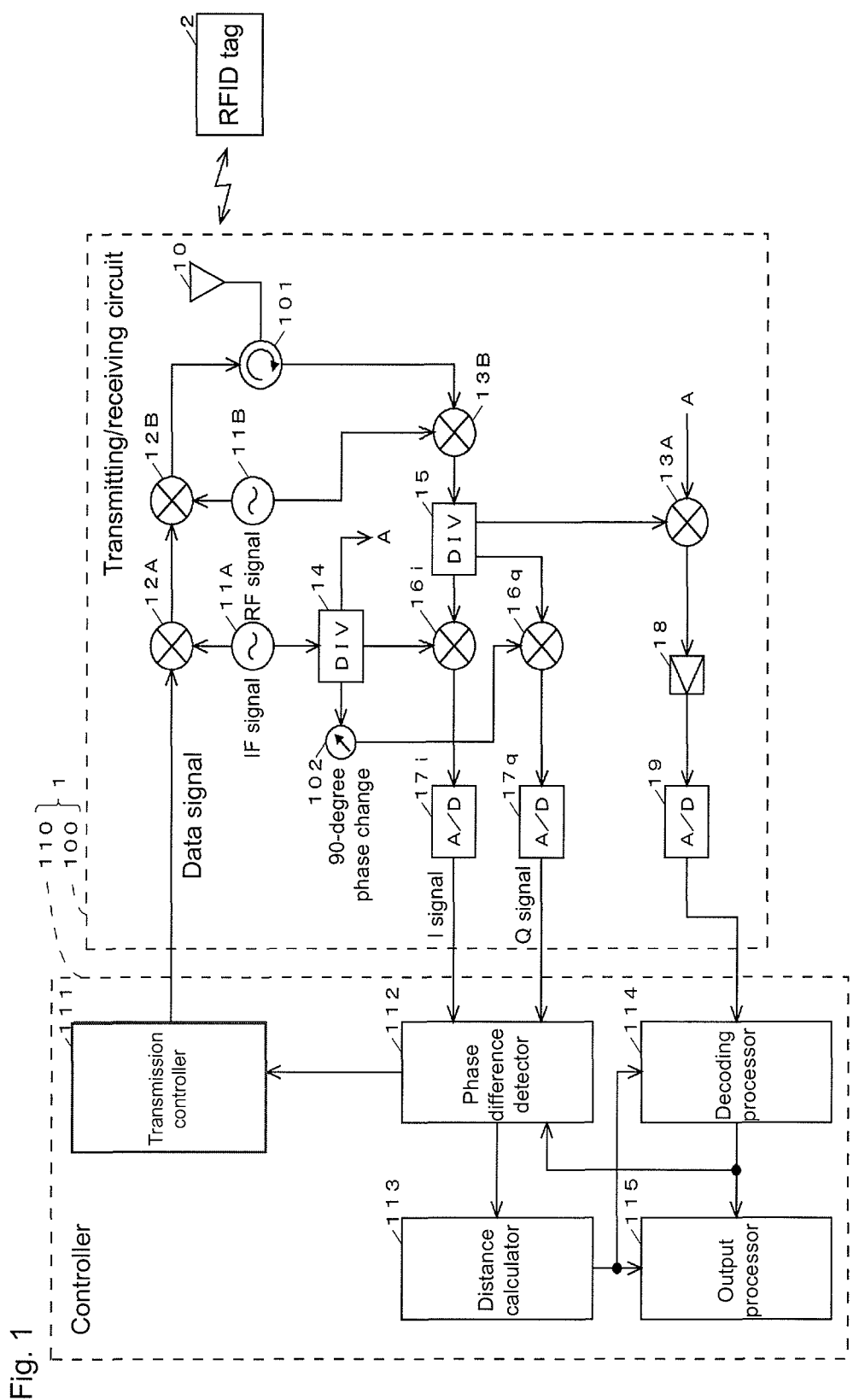
FIG. 1 is a block diagram illustrating a configuration of a reader/writer to which the present invention is applied.

FIG. 1 illustrates a configuration of a reader/writer that is an example of a communication processing device to which the present disclosure is applied.

A reader/writer 1 of an embodiment conducts communication with a passive or semi-passive RFID tag 2 using a radio wave having a UHF band, and performs a process of reading or writing information from and in the tag 2. The reader/writer 1 includes a transmitting/receiving circuit 100 that includes an antenna 10 and a controller 110 that controls an operation of the transmitting/receiving circuit 100. The radio wave used is not limited to the UHF band, but a radio wave having another band may be used.

In addition to the antenna 10, the transmitting/receiving circuit 100 includes a circulator 101, a 90-degree phase shifter 102, two kinds of oscillators 11A and 11B, transmitting processing mixers 12A and 12B, receiving processing mixers 13A, 13B, 16$i$, and 16$q$, distributors 14 and 15, an amplifier 18, and A/D converters 17$i$, 17$q$, and 19. A substance of the controller 110 is a program logic circuit (FPGA), and functions of a transmission controller 111, a phase difference detector 112, a distance calculator 113, a decoding processor 114, and an output processor 115 are provided in the controller 110.

Although not illustrated in FIG. 1, an interface circuit is provided in the reader/writer 1 with respect to an upper-level device (not illustrated). The controller 110 performs a communication process of conducting communication with the tag 2 based on an instruction transmitted from the upper-level device, and transmits a process result to the upper-level device.

An intermediate frequency signal (hereinafter referred to as an "IF signal") of about 15 MHz is output from the first oscillator 11A. A radio frequency signal (hereinafter referred to as an "RF signal") of about 1 GHz is output from the second oscillator 11B. The IF signal is supplied to not only the transmission-side mixer 12A but also the reception-side mixer 13A and the 90-degree phase shifter 102 through the distributor 14. The RF signal is supplied to the transmission-side mixer 12B and the reception-side mixer 13B.

The mixer 12A inputs a data signal output from the transmission controller 111 and the IF signal to mix both the signals, and the mixer 12B inputs the mixed signal from the mixer 13A and the RF signal to mix both the signals. The IF signal is overlapped with a carrier signal of the RF signal by the two-stage mixing process to generate the carrier signal in which a modulation is generated by the data signal. The generated signal is guided from the mixer 12B to the antenna 10 through the circulator 101, and transmitted as an electromagnetic wave.

The transmission controller 111 transmits a continuous wave after outputting the data signal constituting a command. The substantial modulation is generated in a carrier wave during a cycle in which the command is transmitted. When the data signal becomes the continuous wave, a signal in which the IF signal is overlapped with the RF signal is transmitted as an unmodulated carrier wave CW (hereinafter referred to as an "unmodulated wave"). When the tag 2 performs a response operation in response to the command during the cycle in which the unmodulated wave is transmitted, a reflected wave of the response operation arrives at the antenna 10.

The reflected wave that is received from the tag 2 by the antenna 10 is guided to the mixer 13B through the circulator 101. The mixer 13B removes an RF component from the received signal by the mixing process of mixing the received signal and the RF signal, and outputs the IF signal with which the reply signal from the tag 2 is overlapped. The IF signal (hereinafter referred to as a "received IF signal") including the reply signal is distributed to the mixers 13A, 16$i$, and 16$q$ by the distributor 15.

The mixer 13A demodulates the reply signal by mixing the received IF signal and an IF signal (hereinafter referred to as a "reference IF signal") from the oscillator 11A. After the amplifier 18 amplifies the demodulated reply signal, the A/D converter 19 performs digital conversion of the reply signal. The reply signal of a post-digital conversion is input to the decoding processor 114 of the controller 110, and information (response information) indicating a response content is decoded.

The mixer 16$i$ extracts an I signal included in the received IF signal by mixing the reference IF signal from the oscillator 12A and the received IF signal. The mixer 16$q$ extracts a Q signal included in the received IF signal by mixing the received IF signal and the reference IF signal in which a phase is shifted by 90 degrees by the 90-degree phase shifter 102.

After the A/D conversion circuits 17$i$ and 17$q$ perform digital conversions of the I signal and the Q signal, and the I signal and the Q signal are input to the phase difference detector 112.

The phase difference detector 112 checks whether the decoding processor 114 starts the decoding of the response information, and the phase difference detector 112 performs a calculation of the following <Equation 1> using an I signal I(t) and a Q signal Q(t) at arbitrary timing after the decoding is started, thereby calculating an angle φ indicating a phase difference of the received IF signal to the reference IF signal. The distance calculator 113 calculates a distance R from the antenna 10 to the tag 2 by performing a calculation of <Equation 2> using the phase difference φ fixed by the phase difference detector 112 and a frequency λ of the IF signal.

$$\phi = \tan-1(Q(t)/I(t)) \qquad \text{Equation 1}$$

$$R = (\phi/2\pi) * \lambda/2 \qquad \text{Equation 2}$$

The output processor 115 compares the distance R calculated by the distance calculator 113 to a reference distance transmitted from the upper-level device, and transmits the reply signal, in which the distance within the reference distance is calculated, from the tag to the upper-level device. When the distance calculated by the distance calculator 113 exceeds the reference distance, the decoding processor 114 determines that the currently-communicating tag is not suitable as the communication target, and stops the decoding process.

The communication process performed in the reader/writer 1 will be described in detail below with a focus on a method for measuring the distance from the antenna 10 to the tag 2.

Figure 2:
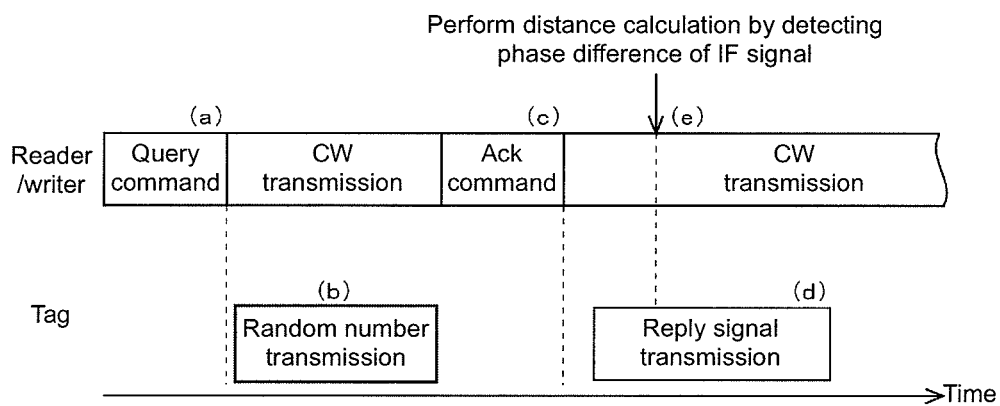
FIG. 2 is a timing chart illustrating a flow of a communication process.

FIG. 2 illustrates a flow of the communication process, which is performed between the reader/writer 1 and the tag 2, along a temporal axis. In the embodiment, based on a standard of EPCglobalC1 Gen2, the reader/writer 1 alternately performs a cycle in which the carrier wave with which the command is overlapped is transmitted and a cycle in which a response is received from the tag 2 while the unmodulated wave (CW) is transmitted. A process of measuring the distance to the tag 2 is also performed during the cycle in which the unmodulated wave is transmitted.

The specific flow of the communication process will be described with reference to FIG. 2. The reader/writer 1 transmits a detection command (query command) to all the tags 2 included in a communicable range (a part (a) of FIG. 2). The tag 2, which receives the command, generates a random number and transmits the random number to the reader/writer 1 (part (b) of FIG. 2). The reader/writer 1 that receives the random number recognizes the number of communicable tags from the number of reception times, and the reader/writer sequentially performs a process of specifying a communication party from the received random number and transmitting a command (Ack command) to make a request to read information and a process of receiving the reply signal from the tag with respect to the command in each tag (parts (c) and (d) of FIG. 2).

When the reception of the reply signal with respect to the Ack command is started, a process of detecting the phase difference of the IF signal and a process of measuring the distance R are performed (part (e) of FIG. 2). Whether the reception of the reply signal is started can be determined such that the decoding processor 114 detects a leading preamble of the reply signal.

Figure 3:
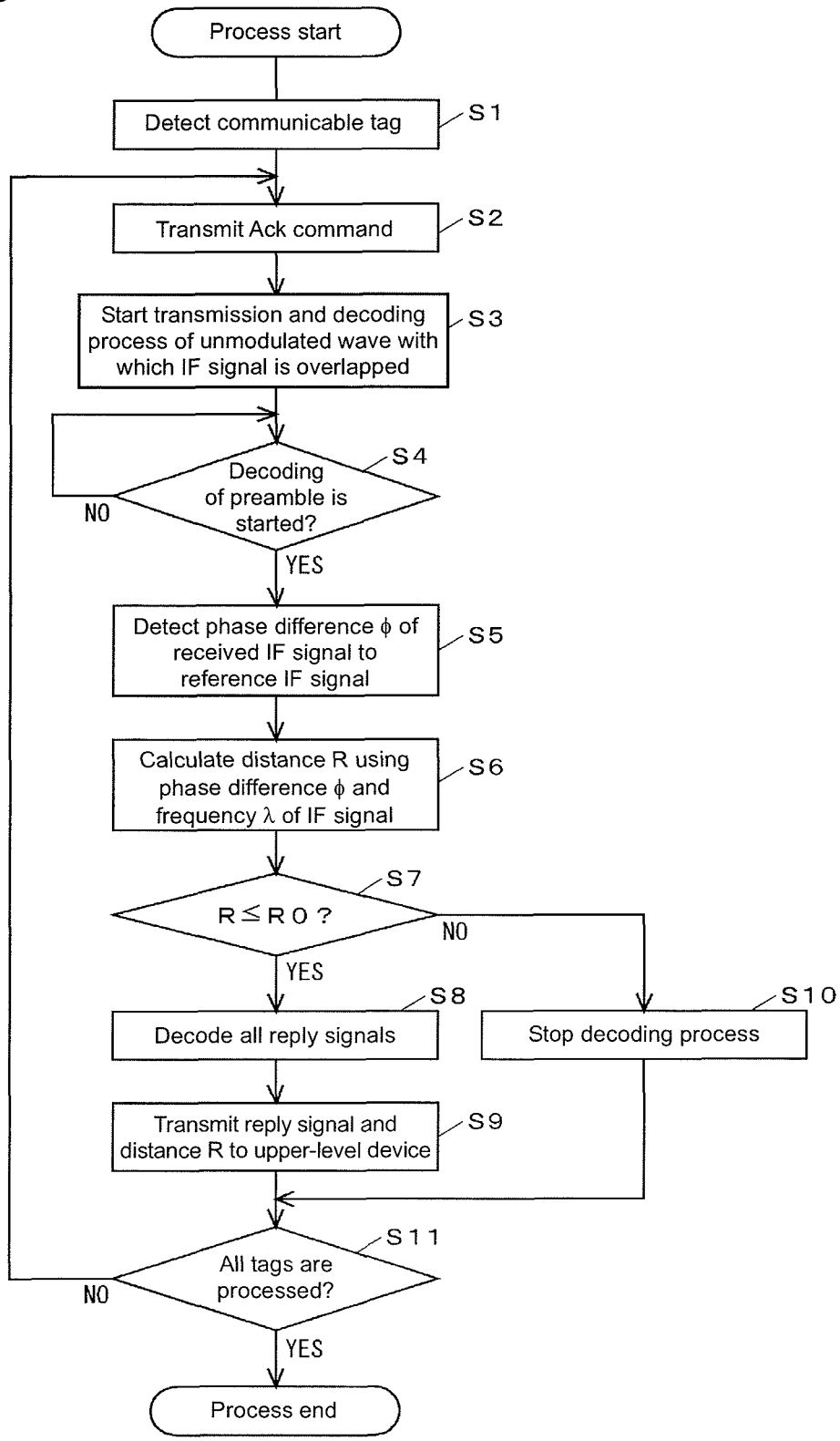
FIG. 3 is a flowchart illustrating a process procedure in a controller of a communication processing device.
Figure 4:
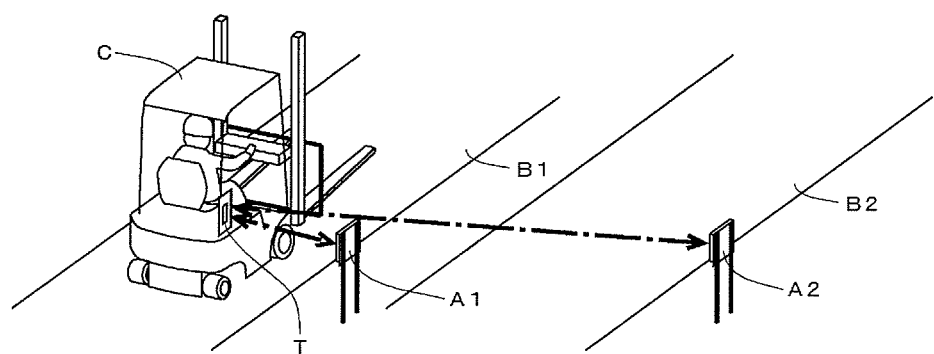
FIG. 4 is an explanatory view illustrating an example of the false communication process.

FIG. 3 illustrates a flow of a sequence of processes performed by the controller 110 of the reader/writer 1 in order to implement the process of FIG. 2.

In Step S1, the communicable tag 2 is detected by performing the process of transmitting the query command and receiving and decoding the response from the tag 2.

Then processes from Step S2 are performed in each detected tag 2. The Ack command is transmitted in Step S2, and the process of transmitting and decoding the unmodulated wave with which the IF signal is overlapped is started in Step S3. Then, the controller 110 waits until the decoding of the preamble of the reply signal is started in the decoding process (Step S4).

When the decoding of the preamble is started ("YES" in Step S4), the phase difference φ of the received IF signal to the reference IF signal is detected using the input I signal and Q signal while the preamble is continued (Step S5). Further, the distance R from the antenna 10 to the tag 2 is calculated using the detected phase difference φ and the frequency λ, of the IF signal (Step S6).

Then the calculated distance R is compared to a reference distance R0. In the case of R≦R0 ("YES" in Step S7), the decoding process is continuously performed to decode all the reply signals (Step S8). Further, the decoded reply signals and the distances R are transmitted to the upper-level device (Step S9). On the other hand, in the case of R>R0 ("NO" in Step S8), the flow goes to Step S10 to stop the decoding process.

Only the reply signal from the tag, in which the distance R becomes within the reference distance R0, is decoded by performing the same process, and the reply signal and the distance R are transmitted to the upper-level device. When the process is completed to all the tags, the affirmative determination is made in Step S11, and the process is ended.

In the frequency (15 MHz) of the IF signal used in the reader/writer 1, a wavelength of the IF signal becomes about 20 m, so that the distance can be measured with respect to the tag 2 located within 10 m from the antenna 10. Therefore, in the case that the maximum distance of the radio wave having intensity to which the tag can react is assumed to be about 10 m, the distance in the range corresponding to condition can be measured.

The reader/writer 1 measures the distance R while performing the process of decoding the reply signal from the tag 2, so that the information on the tag 2 can be acquired while the measurement of the distance is completed during the cycle of the normal communication process. Accordingly, there is no risk of generating a trouble in the communication with the moving tag 2. Because the decoding of the reply signal is stopped with respect to the tag 2 in which the distance R exceeds the reference distance R0, the process can efficiently be performed, and unnecessary information can be prevented from being transmitted to the upper-level device. Further, the decoded reply signal and the calculation result of the distance R are transmitted to the upper-level device, so that the upper-level device can recognize the distance between the tag 2 and the antenna 10 while distinguishing the information on the tag 2.

However, it is not always necessary that the reader/writer 1 selects the reply signal from the tag 2. That is, irrespective of the value of the distance R, the reply signals from all the tags 2 of the communication targets may be decoded to transmit the reply signals and the distances R to the upper-level device. The processes to the process of comparing the distance R and the reference distance R0 are performed, and the data indicating the distance comparison result bundled with the reply signal from each tag may be transmitted to the upper-level device. Therefore, the reply signals can easily be selected in the upper-level device.

A write command is transmitted after the information from the tag 2 is read in the case that the information is written in the tag 2. Therefore, when the response from the tag 2 in which the communication target is specified is received in response to the initial command, the false information can be prevented from being written in the tag 2 by stopping the process to the tag 2 that is determined to be in the position that exceeds the reference distance R.

Description of Symbols 1 communication processing device (reader/writer), 2 RFID tag, 11A, 11B oscillator, 12A, 12B, 13A, 13B mixer, 16 adder, 100 transmitting/receiving circuit, 110 controller, 112 phase difference detector, 113 distance calculator, 114 decoding processor

What is claimed is:

1. A communication processing device for executing a command transmission process of transmitting a command relative to an RFID tag by modulating a carrier wave output from an antenna, a reception process of receiving, while an unmodulated carrier wave is transmitted from the antenna according to transmission of the command, a reflected wave from the RFID tag relative to the unmodulated carrier wave, and a decoding process of decoding, from the received reflected wave, a reply signal from the RFID tag, the device comprising:

a carrier wave communication processor that overlaps an intermediate frequency signal with the carrier wave output from the antenna;

a phase difference detector that extracts the intermediate frequency signal from the reflected wave in response to initiation of reception of the reflected wave in the reception process, and that detects a phase difference of the extracted intermediate frequency signal from the intermediate frequency signal in the carrier wave output at a timing corresponding to the extraction;

a distance measurement calculator that measures a distance to the RFID tag returning the reflected wave, using the phase difference detected by the phase difference detector and a wavelength of the intermediate frequency signal; and a decoding processor that determines whether the RFID tag returning the reflected wave is suitable as a target of communication based on the distance measured by the distance measurement calculator.

2. The communication processing device according to claim 1, wherein the phase difference detector executes extraction of the intermediate frequency signal and detection of the phase difference in response to a detection of a preamble in the reply signal by the decoding process.

3. A distance measurement method implemented in a communication processing device for executing a command transmission process of transmitting a command relative to an RFID tag by modulating a carrier wave output from an antenna, a reception process of receiving, while an unmodulated carrier wave is transmitted from the antenna according to transmission of the command, a reflected wave from the RFID tag relative to the unmodulated carrier wave, and a decoding process of decoding a reply signal from the RFID tag included in the received reflected wave, the method comprising:

overlapping an intermediate frequency signal with the carrier wave output from the antenna;

extracting the intermediate frequency signal from the reflected wave in response to initiation of reception of the reflected wave in the reception process, and detecting a phase difference of the extracted intermediate frequency signal from the intermediate frequency signal in the carrier wave output at a timing corresponding to the extraction;

measuring a distance to the RFID tag returning the reflected wave, using the detected phase difference and a wavelength of the intermediate frequency signal; and determining whether the RFID tag returning the reflected wave is suitable as a target of communication based on the distance measured.

\* \* \* \* \*